United States Patent Office 3,737,323
Patented June 5, 1973

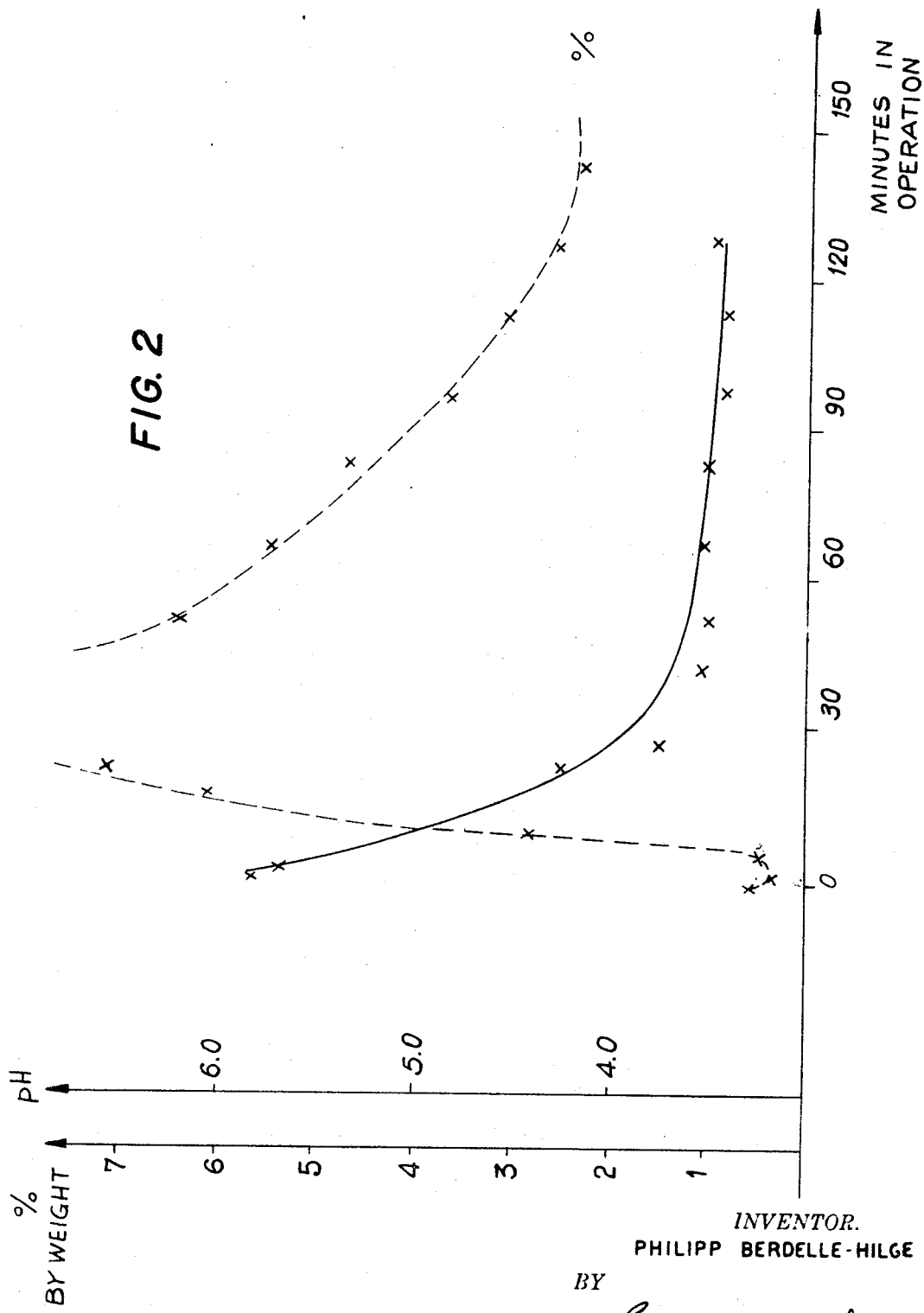

3,737,323
CONTINUOUS FERMENTATION PROCESS FOR PRODUCING ALCOHOLIC BEVERAGES
Philipp Berdelle-Hilge, Mainz (Rhine), Germany, assignor to Intermag GmbH, Aarau, Switzerland
Continuation-in-part of abandoned application Ser. No. 758,019, Sept. 6, 1968. This application Aug. 23, 1971, Ser. No. 173,932
Int. Cl. C12c 11/14
U.S. Cl. 99—31                                       14 Claims

ABSTRACT OF THE DISCLOSURE

Alcoholic beverages are produced by a continuous and accelerated fermentation process. The process involves passing a fermentable liquid by means of a hydraulic pressure of .2 to 10 atmospheres gauge through a layer of a microorganism deposited on a porous zone whereby the liquid is fermented by the microorganism. The fermented liquid then passes through the porous zone, which retains the microorganism, and is recovered to provide an alcoholic beverage.

---

Figure 1:
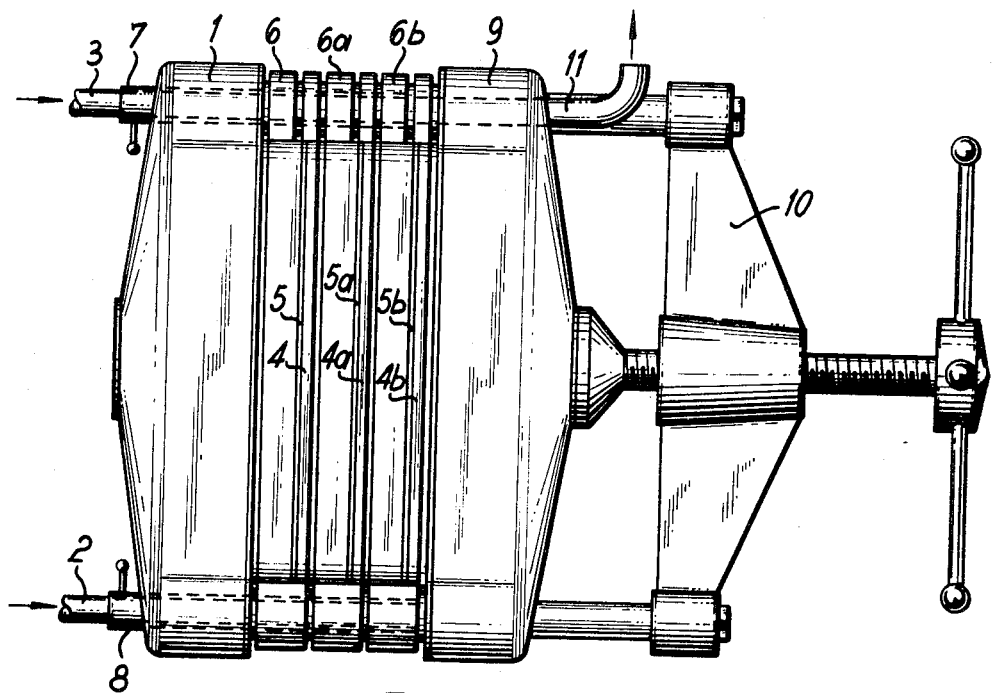

This application is a continuation-in-part of application Ser. No. 758,019, filed Sept. 6, 1968, and now abandoned.

This invention relates to a process for the continuous treatment of liquids in presence of an enzyme producing microorganism; more particularly, this invention pertains to a new process for the continuous production of alcoholic beverages by treating fermentable liquids with microorganisms. Preferably, fermentation of alcoholic beverages such as wine, beer, champagne is contemplated.

A continuous fermentation of wort in the presence of yeast in the manufacture of beer is known from British Pat. 872,395 and from German Provisional Pats. 1,205,-041 and 1,207,324. The first two patents relate to two-stage fermentation processes in which a mixture of wort, yeast and air is subjected to fermentation in a first tank while intensively and continuously agitated, and the mixture is fermented further in a second tank with weaker agitation, whereupon the yeast is separated and the fermented wort is discharged after cooling and separation of the yeast. The last-mentioned German provisional patent describes a continuous fermenting of wort in the presence of yeast of high concentration in a slim fermentation tower. This tower is provided at its lower end with inlets for wort and air and is connected at its upper end to a yeast settling chamber, perforated distribution elements, which extend over the cross-section of the fermentation tower, being arranged over the entire length of the latter.

With such an apparatus, it is said to be possible to operate with yeast concentrations of about 20 to 60% and, hence, correspondingly accelerate the fermentation process.

However, these methods have the disadvantage that yeast, which act as enzyme carrier, is suspended in the wort so that the enzyme is present in the wort to be fermented only in a relatively low concentration of about 2 to 5%. As it is known, however, that the rate of fermentation is a function of the yeast, i.e. enzyme concentration, these processes do not offer any advantage in this respect over batch methods.

In accordance with German Provisional Pat. 1,207,324, the process apparently is carried out with very high yeast concentrations of between 20 and 60% while attempting to maintain the yeast in the fermentation tower in a suspended condition by supporting it directly by means of supporting elements and by distribution the flow of the fermentation gases over the cross-section of the tower. Even in this method, the enzyme concentration is high only at the start of the process while as the process is continuously carried out, the yeast very rapidly is carried along upwards into the settling chamber and is thereby diluted. An analogous method is disclosed in U.S. Pat. 3,310,407.

Another disadvantage of these processes is that the fermented fluid, i.e. beer, is insufficiently separated from the yeast so that an additional filtration step is required.

Another method is described in U.S. Pat. 3,402,103, whereby a microorganism or fermenting organism is grown on sheets. The fermentable liquid or substrate is descending substantially vertically downwardly in a honeycomb-like tower as a thin film. As mentioned by the patentees, considerable microorganism growth does occur when practicing this process, and thus amino acids are lost from the beer wort. Also, it is evident from the recital of the thin film flow rate that stripping of the microorganism would be a problem at higher flow rates.

In U.S. Pat. 3,425,839, a continuous beer making process is disclosed whereby a moving fermentable liquid or substrate and a circulating body of microorganism, i.e. a suspension of yeast cells, are separated by porous membranes to permit the passage of the soluble constituent of the wort and the soluble fermentation products. The microorganism slurry is circulated, i.e. agitated thereby, and the microorganism is not used as a layer through which the liquid is passed. A modification of the process disclosed in the above patent consists of controlled infusing of liquid to be fermented in a body of circulating yeast slurry and withdrawing the fermented liquid therefrom. The fermentation itself is carried out in a conventional fermentation vessel.

The disadvantage of this process is that it is impossible to ferment sufficiently the wort within one cycle, since the circulating body of yeast-containing liquor comprises at any time simultaneously fermented liquor and fresh unfermented wort, which mixtures is removed from said circulating body as the process product. Thus according to this process, sufficiently fermented beer, if any, is only obtainable by multiple recycling the removed, partly fermented liquor through the apparatus. Also, nutrients and oxygen are introduced in the proposed fermentation system as illustrated in the above-mentioned patent; and under these conditions growth and multiplication of yeast cells is obtained.

Another continuous stream brewing process is disclosed in U.S. Pat. 3,407,069. According to the method disclosed in the last-mentioned patent, a stream of fermentable liquid is caused to move upwardly along a sloping upper surface of an enclosed vessel in which a plug of yeast is formed. As the liquid ascends, it carries along with the gas bubbles yeast cells which floculate and return to the plug by descending along the lower surface of the vessel. In essence, the processes is a co-current fermentation of liquid with a self-contained countercurrent return of yeast cells. Fermentation rates of one to four hours are asserted as an achievement. However, the patentees also concede that microorganism population increase must be accepted in this process, i.e. consumption of wort for microorganism growth.

An article by Lilly et al. on Biochemical Journal, Vol. 107, p. 5P (March 1968) discloses the use of porous sheets having enzymes apparently embedded therein or attached thereto and used in trickle-type towers or as porous sheets through which a liquid to be treated is allowed to pass through. As it is well known, alcoholic fermentation is an exceedingly complex reaction with about 13 enzymes participating individually or in combination with each other in the conversion of glucose to ethanol and carbon dioxide. As against live cells which are the most compact and efficient enzyme carriers, enzymes isolated and deposited on a polymer are rather inefficient, requiring large volumes of carrier material, i.e., polymer, per embedded or ionically bound enzyme. Inefficiency of the enzymes occurs for a number of reasons, including the reactions of active enzyme sites with the carrier. Thus, for hexokinase when using it for fermentation in vitro, it is only about 30% of that in vivo; hence, slow conversion rates are the rule.

Inasmuch as large column volumes and exceedingly tall columns must be used and co-substrate relationships between enzymes such as NAD and $NADH_2$ cannot be achieved, the method disclosed in the article authored by Lilly et al. cannot be usefully employed for fermentation of alcoholic beverages. It is especially evident when the costs of isolated enzymes, some of which cost $300,000 per 100 mg., are taken into industrial product pricing considerations. The last consideration, i.e. price of enzyme, makes it imperative not to strip enzymes embedded in porous polymer sheets or ionically affixed to the polymer. Hence, it follows that low throughput rates must be accepted as an additional penalty when operating an enzyme system such as disclosed by Lilly et al.

It is the object of this invention to provide a new process for the continuous treatment and fermentation of liquids by microorganisms, e.g. for the continuous treatment of wort with yeast, in which the fermentation times are very substantially reduced by increasing as much as possible the microorganism efficiency in the fermentation chamber or zone. Another object of the novel process is to provide an apparatus which takes up as little space as possible, which can easily be handled, and from which, after the consumption of the mircoorganism, the latter can be removed completely without any complex, tedious processing.

Still another object of this invention is to provide a new process in which much less fermentation by-products are formed than in conventional methods and wherein substantially no amino acids are lost by growth of the yeast cells. Finally, in accordance with the novel process, it is also possible to operate at higher temperatures, i.e. above the previously known optimum conditions for the microorganism in question, thus further reducing the time of treatment.

In accordance with the invention, the method for the continuous treatment of a liquid with a microorganism consists in conducting the liquid through a deposit of a microorganism which is on at least one porous body and then conducting the liquid through said deposit and through said porous body. The pores of the porous body are so dimensioned or sized that the microorganism is retained substantially completely on the porous body but permits passage of the liquid to be treated through the pores.

When the expression "microorganism" is used herein, it is to be understood as any enzyme-producing microorganism employed for production of alcoholic beverages such as beer, wine, champagne, etc. Further, the term microorganism embraces the same when used such as for instance on adsorbent carrier materials on which the microorganism has been adsorbed by immersion of the carrier materials in the microorganism suspension or slurry.

Without espousing or being bound by any of the theories which may be conducive for understanding the unexpected results achieved by the present process, the following two explanations or theories are advanced.

According to the first explanation or theory, liquid to be fermented under hydraulic pressure employed in the process is pressed through the cells. As a result of the liquids passing through the cell, the enzymes in the cell are more exposed to the liquid, and the fermentation reaction is especially fast.

According to the second explanation or theory, the hydraulic pressure causes the microorganism's cell membranes to change so that the enzymes are released from the interior of the cell or at least become more exposed to the liquid to be fermented.

Thus, whereas according to the prior art, the efficiency of a fermentation process, i.e. beer making, has been sought to be increased by increasing yeast concentration, i.e. the amount of yeast used for fermentation of a weight unit of beer wort, or by achieving better interface between yeast cells and beer wort or individual enzymes and a liquid to be fermented (cf. U.S. Pats. 3,310,407 and 3,407,069; or U.S. Pats. 3,402,103 and 3,425,839 and the article by Lilly et al.); according to the present invention, a quantum jump in efficiency has been observed in the fermentation of beer wort which can only testify to a different behavior of microorganism under the process conditions disclosed herein. For example, at steady state conditions fermentation times may be from 2 minutes for fresh yeast to 30 minutes for yeast which has been used for about 5 to 7 days; yeast concentration is in the range of 2.5 to 6 liters per 100 liters of beer wort; a separate filtering step may be omitted; fermentation shall be conducted for the duration of the yeast charge essentially without any microorganism growth under anaerobic conditions or the growth shall be substantially and significantly reduced; investment costs for a plant using the present process may be 20% less than for conventional processes; the space needed for the process equipment is considerably reduced; the process may be readily interrupted; almost no undesired fermentation by-products are formed; substantially no amino acids of the fermented beer wort are lost for growth of yeast cells, etc.

For the sake of simplicity, the method will be explained below on basis of the fermentation of wort in presence of yeast to form beer. However, it is expressly pointed out that the method is also suitable for any other treatment of liquids with microorganisms such as: the fermentation of other alcoholic beverages, e.g. wine or champagne.

In the process of the present invention, it is preferable to proceed by pumping a microorganism, e.g. yeast, preferably together with a solid diluent, in an aqueous suspension through an inlet opening of a fermentation chamber, the outlet opening of which consists of a porous body, such as a frit-like porous plate. As the pores of the porous body are so small, for example $3\mu$, that the microorganism is retained on it in the fermentation chamber while the carrier-suspending liquid flows through it, the microorganism, preferably together with the solid diluent, collects as a deposit on the porous body. Thereupon, the liquid to be treated, in this case wort for the obtaining of beer, is conducted continuously through the fermentation chamber until the microorganism in the fermentation chamber is used up. At this time the flow of the treated liquid is interrupted for a short time and the spent microorganism is removed from the fermentation chamber, for example by back-washing. Thereafter, suspended microorganism is again forced into the fermentation chamber, and the liquid to be treated such as wort is again continuously passed through the same. A continuous separation of spent microorganism is, however, also possible in a rotary filter apparatus, instead of the back-washing step.

It is evident that the temporary interruption of the novel, continuous process, in order to remove the spent microorganism lasts only for a short time and, therefore, scarcely detracts from the continuous operation which is carried out in actual practice.

Instead of introducing the microorganism into the fermentation chamber before passage of the liquid which is to be treated, the microorganism can also be added to the liquid itself in the quantity necessary for the depositing on the porous body, in which case it also deposits on the porous body at the outlet end of the fermentation chamber.

It is particularly advisable in the process of the invention to pass the liquid to be treated through two or more fermentation chambers connected in series. The speed of fermentation is thereby greatly increased. Moreover, the desrtuction of the microorganism, which occurs constantly during the fermentation resulting in the reduction of the microorganism concentration in the fermentation chamber, can be overlooked during a large part of the treatment period because it is slight. Operation with a pluraltiy of porous bodies connected in series with each other and having microorganisms deposited on them, or preferably with a plurality of fermentation chambers connected in series, has the further advantage that it is possible to operate with different microorganism, such as different types of yeast, which lead to a different rate of fermentation.

In the present process, the liquid is preferably forced under hydraulic pressure through the treatment chambers, for example at pressure from about 0.2 to 10 atmospheres, preferably 0.5 to 5 atmospheres, and especially advantageously at 1 to 3 atmosphere (gauge). Furthermore, it is advantageous to operate at elevated temperatures because in this manner the speed of fermentation can further be increased.

In the case of previously known fermentation processes, it was believed that the temperature of the liquid to be treated, such as wort for the production of beer, cannot be increased beyond the optimum temperature known for the microorganism used without the microorganism's being destroyed to a considerable extent and the rate of fermentation thus reduced. In the present method it was found that a destruction of a part of the microorganism caused by increasing the temperature above the previously believed optimum for the microorganism in question, for example 50° C. instead of 30° C., does not bring about any destruction of the enzyme (which has a higher optimum temperature than the microorganism) nor brings about any detrimental consequences to the process; and the advantages of the accelerating of the fermentation effected by the increase in temperature far outweigh the disadvantages of the destruction of a part of the microorganisms.

Accordingly, it is particularly advantageous in the novel process to increase the temperature of the treated liquid, for instance by heating elements arranged in the fermentation chambers, to a temperature which is above the previously known optimum temperature for the microorganism in question. Furthermore, when using a plurality of treating chambers, temperatures can be used which vary from chamber to chamber.

As mentioned before, one of the especially advantageous aspects of the present invention is the fast fermentation time. Thus fermentation times from 1 minute to 2 hours represent the broad time period; however as a practical matter, fermentation can be achieved within 2 to 30 minutes, the longer time being associated under the conditions shortly before the microorganism is spent. The amount of microorganism used is normally between 2.5 to 6 liters per 100 liters of liquid to be treated, preferably 3 to 4 liters.

The advantages of the present method over the previous methods reside primarily in the fact that the times of residence in the treatment zone can be very greatly reduced. This is possible as a result of the high enzyme concentration in the microorganism deposit in the treatment chamber since the chemical reactions such as the fermentation take place very much faster thereby.

For this reason, apparatuses which are very much smaller are required when compared to the prior art apparatuses for the obtaining of equal quantities of treated liquid. Moreover, operating time and labor are also saved. By the rapid passage of the liquid through the treatment zone, increase in the process pressure, and working at temperatures beyond the previously known optimum, a further reduction of the treatment time or residence time is obtained, thus counteracting the disadvanages resulting from an increased consumption of microorganism and thereby being able to neglect the same. Another advantage of the novel method is that with the small size of an apparatus required the replacement of the microorganism after a certain period of time (which is always necessary even in known methods) can be carried out easily and fast.

A further preferred embodiment of the process is to dilute the cells of the microorganism on the porous zone by using these with a solid diluent such as asbestos-plastic fiber, plastic spheres, mineral powders, wood flour, kieselghur, diatomaceous earth, precipitated silica or other particulate inert materials. Passing of the liquids to be treated through the deposited microorganism is facilitated thereby since such an inert solid diluent acts as a "fluffing" material.

In accordance with the invention, still another preferred embodiment of the process consists in using a microorganism which is adsorbed on a surface-active, inert carrier material and thus is of a fixed quantity. This facilitates the carrying out of the fermentation since the microorganism, such as yeast, can be accurately dosed, i.e. measured.

A microorganism which can be dosed in a given quantity is obtained by mixing the enzyme-supplying microorganisms, such as yeast, in aqueous suspension with a surface-active, inert carrier material which also acts as a "fluffing" material and after adsorption on the carrier material subjecting same to a careful drying.

Surprisingly, it has thus been found that a definition by weight of the number of bacteria in the microorganisms is possible when these are adsorbed on surface-active material such as silica, silica-gel, activated carbon, asbestos, kieselguhr or perlite. These surface-active and carrier materials can be so developed with respect to the size of their surface or so selected by mesh sizes that a given quantity of the said materials adsorbs a given determinable number of microorganisms. The determination of this value can be obtained quantitatively by emperical methods in the laboratory and provides reproducible values.

For example, suitable materials for this purpose are pyrogenic silicas (highly dispersed, very pure silicas) having a surface of $175\pm25$ m.$^2$/g. (by the BET method) of a particle size of between 10 and 40 or pyrogenic silicas having a surface of 300 m.$^2$/g. with a size of the primary particles of 3 to $15\mu$, or $460\pm50$ m.$^2$/g.; or else oxide mixtures having a surface (determined by the BET method) of $200\pm25$ m.$^2$/g. and size of the primary particles between 10 and 40 or 20 to $50\mu$. Similarly, for purposes of the novel process suitable materials are pyrogenically obtained, mixed oxides having an $SiO_2$ content of more than 98.3% a size of the primary particles of 20 to 40 or 10 to $30\mu$ and a surface as determined by the BET method of $60\pm15$, $80\pm15$, or $170\pm30$ m.$^2$/g.

In the case of pure silicas, BET surfaces of 120 m.$^2$/g. (diameter of primary particles $28\mu$) have proven suitable and BET surfaces of 240 m.$^2$/g. (primary particle diameter of $16\mu$) have proven advantageous. Similar suitability is also demonstrated in the case of calcium silicates ($SiO_2=47$ to 49.9%, $Al_2O_3$ 0.4 to 0.5% and a BET surface of 130 m.$^2$/g. with an average particle size of $35\mu$). In the case of active precipitated aluminum silicates, good results have been obtained with a BET surface of 130 m.$^2$/g. and a primary particle diameter of $30\mu$.

By mixing the microorganism suspension with the adsorption material and after careful removal of the moisture, preferably by adsorption drying without heating, a dry mass is obtained which prevents further reproduction in view of the absence of a liquid nutrient and can thus be stored without multiplying or at least having a reduced capability for multiplying. This dry mass can be stored without the maintaining of special temperatures and can be dosed out in precise weights whereby a uniform addition of the microorganisms is obtained.

With reference to the accompanying drawings and by way of further explanation of the method of the invention, an apparatus is depicted in FIG. 1 thereof which illustrates the advantages of the carrying out of the novel process as well as the use of the apparatus.

In the apparatus, the two pressure covers 1 and 9 are pressed together with the aid of a manually operated pressure device 10. These pressure covers hold between them three fluid treating chambers 6, 6a, and 6b. These treating chambers are connected together in series and are separated from each other by porous plates 5, 5a, and 5b, which are reinforced by supporting elements 4, 4a and 4b. The conduit 2 which has lateral (side) openings to each of the treating chambers 6, 6a and 6b serves as a feed line for suspending the microorganism, e.g. in water. By means of a pipe socket 8 or an enveloping pipe which is supported displaceably in the conduit 2 and which also has lateral openings, the inlet openings to the treating chambers can be closed or opened as desired. A second pipe conduit 3 which serves to feed the liquid to be treated into the first treating chamber 6 can be closed by a similar pipe socket 7. The collecting line 11 or conduit serves for the discharge of the completely treated liquid emerging from the last treating chamber 6b.

Upon the operating of the apparatus described, the inlet opening for the liquid to be treated in the conduit 3 is first of all closed by means of the pipe socket 7. Thereupon, through the pipe conduit 2 and the inlet openings of said conduit to the treating chambers 6, 6a, and 6b, an aqueous suspension of the microorganism is pumped into the treating chambers, the liquid of the suspension being withdrawn through the porous plates 5, 5a and 5b, and through the collecting conduit 11 and the microorganism collected as a deposit in the treating chambers on the porous plates. Thereupon by means of the pipe socket 8, the inlet opening of the pipe conduit 2 to the treating chambers 6, 6a and 6b are closed and the inlet opening of the pipe conduit 3 to the first treating chamber 6 is opened by actuation of the pipe socket 7. Then the liquid which is to be treated is pumped through the pipe conduit 3 through the in series connected treating chambers 6, 6a and 6b, and this liquid emerges from the treating chamber 6b into the collecting conduit 11. In this connection, the liquid in each of the treatment chambers first flows through the deposit of the microorganism on the porous plate and then through the porous plate itself. Moreover, in the treating chambers 6, 6a and 6b, heat exchange plates can be provided (not shown) which have openings through which the liquid flows. These plates can serve either for the cooling or heating of the liquid to be treated and can have a different temperature in each of the treatment chambers.

The features of the apparatus shown in the drawings can be modified in various manners. Thus, for instance, the pipe sockets 7 and 8 shown can be replaced by other shutoff members such as ordinary valves; and the treating chambers 6, 6a, and 6b can be provided with separate feed lines for the microorganism so that different microorganisms can be introduced into the individual treating chambers.

Thus, the above-described apparatus has at least one chamber with two inlet openings to be closed in succession by closure members, namely one for the microorganism and one for the liquid to be treated, as well as an outlet opening formed by a porous body for the liquid and a collecting line connected with the outlet opening for the liquid emerging from the chamber.

Accordingly, the apparatus has two or more chambers connected in series, each having an inlet opening for the microorganism and an inlet opening and an outlet opening for the liquid to be treated, the porous body which forms the outlet opening of the preceding chamber forming in each case the inlet opening for the following chamber, as well as a collecting line in communication with the outlet opening of the last chamber. If the porous bodies, in accordance with one suitable embodiment of the invention, are provided on the downstream side with supporting elements, such as elements 4, 4a or 4b, the latter may consist for instance of perforated plates through which the liquid passes directly into the next chamber or these may be solid plates, in which case the liquid is then deflected from these plates into a channel arranged on the side of the chamber and from there into the next chamber.

In this connection, devices for changing the temperature of the liquid to be treated, for instance, for the heating or cooling thereof, can preferably be provided in some or all of the in series-connected chambers. Suitable heating devices can in this connection consist of heat exchange plates arranged parallel to the porous bodies and having openings through which the liquid to be treated passes.

The following examples serve further to explain the method of the invention and the advantages obtained thereby.

EXAMPLE I

In a laboratory test the above-described apparatus was used with only one chamber for the fermentation of beer wort by means of yeast. At the start of the experiment, washed and pressed brewery yeast was formed into a suspension as a viscous mass in water, and the same introduced into the treating chamber in an amount that a yeast cake of a thickness of 30 mm. deposited on the porous plate having a surface of 20 x 20 mm. Thereupon, original beer wort of 13.2% total extract, measured by hydrometer (with due consideration of the temperature correction) was pumped through the treating chamber, the yeast cake, and the porous plate. At the start of the experiment, water still contained in the yeast cake was washed out by the beer wort so that the first runnings of the process were discarded. The temperature in treatment chamber was maintained at 14° C. The contact time of the beer wort in the yeast cake was about 2 minutes, after steady-state conditions had been reached.

The apparent degree of fermentation (fermentation-cellar fermentation degree) of the beer emerging from the treatment chamber was 4.2% total extract, also measured with hydrometer (with due consideration of the temperature correction).

This experiment shows that it is possible by the present invention in a continuous process, with contact times of the beer wort with the yeast being of only about 2 minutes to obtain customary degrees of fermentation which heretofore were obtainable only with contact times of several hours.

EXAMPLE II

In a process which is practiced essentially as described above, at a pressure of 4 atmospheres and an extracts content in unfermented beer wort of 11.6%, the wort was fermented to a final extracts content of 2% in the presence of a yeast content of 5% for 56 hours. After an induction period of 180 minutes, the steady-state conditions were achieved. The presteady-state and steady-state conditions are illustrated in FIG. 2, wherein the pH and extracts by weight are plotted as a function of fermentation time at 4 atmospheres hydraulic pressure through the porous bed.

It has been found that further fermentation over the same yeast bed can be continued for a considerable period, e.g. 7 days, however with slightly increased fermentation period (decreasing fermentation rate).

What is claimed is:

1. A process for a continuous and accelerated fermentation of liquids for production of alcoholic beverages in presence of an enzyme-producing microorganism comprising the steps of: passing a fermentable liquid by means of a hydraulic pressure of 0.2 to 10 atmospheres gauge under substantially anaerobic conditions through a layer of a microorganism deposited on at least one porous zone whereby said liquid is fermented by the microorganism and conducting the fermented liquid which has been passed through said microorganism layer through the porous zone to obtain an alcoholic beverage, the pores of said porous zone being of a size that the microorganism is retained essentially completely as a layer on the porous zone but permitting the passage of the liquid which is being fermented.

2. The process according to claim 1, wherein the liquid is conducted through at least two porous zones containing on each of same a deposit of a microorganism.

3. The process according to claim 1, wherein the liquid is conducted through the microorganism and the porous zone by means of hydraulic pressure in the range of from 0.5 to 5 atmospheres gauge.

4. The process according to claim 1, wherein the liquid is conducted through the porous zones by means of hydraulic pressure in the range of from 1 to 3 atmospheres gauge.

5. The process according to claim 1, wherein the liquid is passed through the porous zones at elevated temperatures above the optimum temperature for the microorganism and at optimum temperatures for the enzymes in said microorganism.

6. The process according to claim 1, wherein the liquid is conducted successively through a plurality of porous zones having deposits of different microorganisms thereon.

7. The process according to claim 1, wherein a temperature which varies from porous zone to porous zone is used in each porous zone.

8. The process according to claim 1, wherein the liquid is conducted through the deposited microorganism diluted by an inert solid diluent admixed therewith.

9. The process according to claim 1, wherein the microorganism is deposited from a suspension on the porous zone before the continuous passage of the liquid to be treated.

10. The process according to claim 1, wherein a microorganism is employed in fixed quantity, adsorbed on an inert carrier material.

11. The process according to claim 10, wherein the microorganism is used as adsorbed on silica or activated carbon as a fluffing material for said microorganism.

12. The process according to claim 10, wherein the microorganism employed is adsorbed on highly dispersed pyrogenic silica.

13. The process according to claim 1, wherein 2.5 to 6 liters of microorganism are used for 100 liters of liquid to be fermented.

14. The process according to claim 1, wherein the residence time of said liquid to be fermented is from 1 minute to 2 hours on basis of set extract content by weight.

References Cited
UNITED STATES PATENTS

| | | | |
|---|---|---|---|
| 3,310,407 | 3/1967 | Royston | 99—31 |
| 3,210,196 | 10/1965 | Cottan et al. | 99—29 |
| 3,402,103 | 9/1968 | Amberg et al. | 195—116 X |

OTHER REFERENCES

Hough et al., New Method of Producing Beer by Continuous Fermentation, J. Inst. Brem., vol. 66, 1960 (pp. 301–304).

A. LOUIS MONACELL, Primary Examiner

D. M. NAFF, Assistant Examiner

U.S. Cl. X.R.

99—30, 35; 195—111, 115, 116, 139